Patented June 23, 1953

2,643,231

UNITED STATES PATENT OFFICE 2,643,231

PREPARATION OF HYDROGEL BEADS FOR DRYING

Henry Erickson, Calumet City, Ill., assignor to Sinclair Refining Company, New York, N. Y., a corporation of Maine No Drawing. Application January 28, 1950,
Serial No. 141,171

4 Claims. (Cl. 252—448)

This invention relates to improvements in manufacture of silica gel and silica gel base cracking catalysts in bead form.

Bead form catalysts are particularly useful in bed type cracking processes of either the fixed bed or moving bed type. Silica gel beads are useful in the manufacture of cracking catalysts by incorporation of active metal oxides such as alumina or magnesia and in adsorption-desorption processes. The bead form is characterized by homogeneity of structure and smooth spherical or spheroidal shape. As a consequence the bead form is advantageous in fluid-solid contacting processes where the solid contact material is handled as a bed in particle form. The bead form particles pack well to form a homogeneous bed which minimizes channeling of fluids and promotes uniformity in contacting. In catalytic cracking, uniformity of contacting is important in terms of capacity and maximum conversion per pass and also in the regeneration cycle in terms of capacity and efficiency of regeneration. The bead form also is easy to handle and has satisfactory resistance to attrition. For example, bead form particles may be handled satisfactorily by gas or vapor lift.

The manufacture of silica gel and silica gel base particles in bead form is made difficult and expensive because the bead form particles are produced as hydrogels which must be dried and thermally treated before use, the bead form hydrogels being highly susceptible to splitting and fracturing during such drying. Consequently, it is generally understood that it is necessary to resort to expensive and complicated drying expedients to reduce breakage to a tolerable amount. For example, it is necessary to use equipment adapted to close control on a commercial scale that permits a closer control and gradual temperature rise over the drying cycle. Another expedient is illustrated in Payne Patent No. 2,472,776 which describes drying at 100 per cent relative humidity and constantly increasing temperatures.

I have found that breakage of silica gel and silica gel base during drying may be reduced to a very low quantity if the bead form hydrogel is treated before drying with an aqueous solution of a surface active agent. According to my invention the bead form hydrogel is treated by washing or slurrying in an aqueous medium containing a small amount not exceeding about 1.0 weight per cent of the surface active agent. The treated bead form hydrogel then may be subjected to ordinary constant oven temperature drying or to controlled temperature rise drying at high rates with only a small amount of breakage occurring.

In my co-pending applications Serial Nos. 141,169 and 141,170, both filed of even date herewith, I have described treatment of silica-gel metal oxide cracking catalysts with small amounts of surface tension reducing agents in order to improve porosity and permeability of the catalyst structure and to improve product distribution resulting from the use of the treated catalysts in hydrocarbon processes. In treating bead form hydrogels, however, the improvement in breakage does not appear to be the result of the surface tension reducing function of the surface agents but appears to result in the capacity of the surface active agent to form a colloidal film over the surface which is permeable to water vapor so that water evaporation is slowed down but not prevented. In some instances porosity is improved by the treatment and this improvement may be due to surface tension reduction. Breakage of homogeneous beads in drying then is probably prevented by the controlled evaporation rate such that the surface does not dry much faster than the interior portion of the beads. Of course, this explanation is based upon theoretical considerations only, and my invention does not depend upon its accuracy. I have found, however, that materials of low surface tension such as oil and alcohols appear to be completely ineffective in reducing breakage in drying and indeed in certain instances promote breakage. Also, I have found that too much of the surface active agent must not be used in treatment according to my invention or the improved resistance to breakage in drying is entirely lost. The upper limit in terms of concentration of the agent in water using the minimum amount of water to obtain a completely fluid slurry appears to be about 1.0 weight per cent. The amount of agent necessary for improvement depends in general upon the nature of the agent and the solids content of the hydrogel. Ordinarily about 0.1 to 0.5 weight per cent is sufficient. The concentration of agent used is based on the total water, including that contained in the hydrogel. Where the hydrogel contains about 90% water for example, the concentration based on solids may be obtained by multiplying by a factor of nine.

The useful agents are surface active agents whose molecules contain both a hydrophobic portion and a hydrophilic portion such as a soap or detergent. A wide variety of surface active materials is known in the art. See for example the classification and description of commercially known surface active agents by John W. McCutcheon "Chemical Industries" vol. 61, 811–822, November 1947. The useful materials include, for example alkyl aryl sulfonates and sulfonic acids, sulfonated alkyl succinates, sulfated fatty alcohols, fatty esters of polyhydroxy alcohols, condensation products of ethylene oxide and fatty acids and the like. The cationic detergents such as the quaternary ammonium compounds also appear useful although they are more expensive at the present time.

Many of the useful detergents contain a metallic ingredient which is undesirable in finished cracking catalysts, e. g. sodium which tends to promote sintering and loss of area of silica gel catalysts. I have found that these materials may be improved for use according to my invention by exchange reaction with metals such as magnesium or radicals such as ammonium which are not harmful and which actually contribute to activity as in the case of magnesium. In addition to the commoner soaps, I have found that ammonium soaps of higher fatty acids, e. g. ammonium laurate and the ammonium soaps of mixed fatty acids derived by oxidation of waxes, are valuable in the process of my invention. A mixture of the agents may be used if desired.

As indicated above, silica gel beads useful in adsorption processes may be profitably treated according to my invention. Mixed gels, however, of the type commonly employed in catalytic cracking processes in the petroleum industry are treated with particular advantage. Thus bead form silica alumina hydrogel, silica magnesia hydrogel or silica gel base catalysts containing mixtures of alumina and magnesia or other active ingredients such as zirconia or titania are illustrative. The silica gel base catalyst may be prepared by co-precipitation methods, by impregnation of preformed silica hydrogel beads or by incorporation of the metal oxide ingredients in finely divided form into the silica sol.

The materials are ordinarily prepared in bead form by dropping particles of the sol or partially formed gel through a column of oil. The recovered spherical particles or beads of hydrogel are washed free from inorganic materials and then are hardened by drying and finally are activated by calcination by high temperatures. According to my invention the bead form hydrogel is first treated so as to incorporate a small amount of surface active agent. For example, at the conclusion of the washing step, the bead form hydrogel is contacted with an aqueous solution of the surface active agent. Adsorption ordinarily is incomplete so that the excess solution drained from the hydrogel may be recycled to obtain maximum utilization of surface active agent.

The effectiveness of treatment according to my invention is illustrated in the following examples:

*Example I*

Silica hydrogel in bead form was washed free of sodium and sulfate ions with dilute sulfuric acid and demineralized water. A sample of the beads was placed into an oven at 110° C., dried for 24 hours and calcined for 3 hours at 1350° F. The furnace temperature was raised as rapidly as possible from room temperature to 1350° F. in about ¾ hour. Every bead was either completely shattered or so badly fissured as to be useless. The apparent density of the product was 0.52.

A second sample of the beads, was treated with water containing 0.1 per cent of Aerosol OS (isopropyl naphthalene sodium sulfonate) but otherwise in an identical manner. Of 148 beads examined only one was fissured. Of ten beads tested, 3 had a crushing strength of 55 pounds, one of 70 pounds and the balance of over 80 pounds. The apparent density was 0.47. It is probable that this slight difference in density is due to the closer packing of the shattered beads.

*Example II*

Silica-alumina hydrogel in bead form was treated in a manner similar to Example I with and without a 0.1 per cent solution of Aerosol OS (isopropyl naphthalene sodium sulfonate). With the untreated sample, breakage upon heat treatment amounted to 93 per cent. With the sample treated with the surface active agent, breakage was reduced to 5 per cent.

*Example III*

In the following tests, the washed hydrogels in bead form were treated with varying surface active agents in varying amounts and then dried. The results are tabulated below together with control tests on blank samples:

| Composition | Treatment with Surf. Act. Agent | Heat Treatment | Percent Whole | Percent Breakage |
|---|---|---|---|---|
| | Percent | | | |
| SiO₂ | | None, Hydrogel | 93.2 | |
| SiO₂ | | Dried at 110° C | 23.4 | 75.2 |
| SiO₂ | ᵃ 0.1 | do | 86.0 | 7.7 |
| SiO₂ | ᵃ 1 | do | | |
| SiO₂ | ᵃ 0.1 | do | | |
| SiO₂:Al₂O₃ | | None, Hydrogel | 87.1 | |
| SiO₂:Al₂O₃ | | Dried at 110° C | 22.0 | 75.0 |
| SiO₂:Al₂O₃ | ᵃ 0.1 | do | 82.6 | 5.2 |
| SiO₂:Al₂O₃ | ᵃ 1.0 | do | 56.7 | 35.4 |
| SiO₂:Al₂O₃ | ᵃ 0.5 | do | 87.0 | 0.0 |
| SiO₂:Al₂O₃ | ᵃ 0.01 | do | 38.2 | 56.0 |
| SiO₂:Al₂O₃ | ᵃ 0.001 | do | 32.8 | 62.2 |
| SiO₂:Al₂O₃ | ᵇ 0.1 | do | 76.2 | 12.5 |
| SiO₂:Al₂O₃ | ᶜ 0.1 | do | 86.0 | 1.3 |
| SiO₂:Al₂O₃ | | Dried in vacuum oven | 29.9 | 65.6 |
| SiO₂:Al₂O₃ | ᵃ 0.1 | do | 80.8 | 7.2 |
| SiO₂:Al₂O₃ | ᵈ 0.1 | Dried at 110° C | 76.0 | 12.7 |

ᵃ Aerosol OS (isopropyl naphthalene sodium sulfonate).
ᵇ Ammonium laurate.
ᶜ Dodecyl benzene magnesium sulfonate.
ᵈ Sodium salt of Nacconal RSA (alkyl aryl sodium sulfonate).
ᵉ Glim (diamyl phenol ethylene oxide polymer).

Example IV

In the following treatments, 200 grams of the hydrogel in bead form were covered with 100 ml. of a solution of various agents. The samples were drained, dried at 110° C. and calcined for 2 hours at 1050° F. The calcined beads were separated and the whole and broken beads weighed. The percentage breakage is based on the difference in the weight percent broken beads in each sample as compared to that of the original hydrogel. The results at differing concentrations for different agents follow. The original hydrogel contains 87.1% whole beads.

| Agent | Percent Agent | Percent Whole beads | Percent Breakage |
|---|---|---|---|
| None | | 22.0 | 75.0 |
| Aerosol OT [1] | 0.01 | 55.0 | 25.4 |
| Do | 0.1 | 83.0 | 4.5 |
| Do | 0.3 | 87.7 | 0.0 |
| Do | 0.5 | 84.1 | 3.4 |
| Do | 1.0 | 60.0 | 31.1 |
| Glim [2] | 0.01 | 62.9 | 27.8 |
| Do | 0.1 | 90.6 | 0.0 |
| Do | 0.3 | 88.2 | 0.0 |
| Do | 0.5 | 78.6 | 9.8 |
| Do | 1.0 | 62.0 | 28.8 |
| Igepal CA [3] | 0.01 | 33.1 | 62.0 |
| Do | 0.1 | 59.7 | 31.4 |
| Do | 0.3 | 63.0 | 25.4 |
| Do | 0.5 | 90.7 | 0.0 |
| Do | 1.0 | 70.0 | 19.6 |

[1] Dioctyl sodium sulfosuccinate.
[2] Diamyl phenol ethoxy polymer.
[3] Paraisoctyl ethoxy polymer.

Example V

The silica alumina bead of Example IV after treatment with 0.1 weight percent of Glim (diamyl phenol ethoxy polymer) was dried, calcined and the effect on pore radius was determined by conventional nitrogen isotherm procedure. The hysteresis data follow:

| Agent | $N_2$ area, m.$^2$/g. | Pore radius, A. U. |
|---|---|---|
| None | 440 | 21.8 |
| 0.1% Glim | 526 | 31.0 |

I claim:

1. In the preparation of bead form silica gel base cracking catalyst selected from the group consisting of silica alumina and silica magnesia, the step of treating the bead form hydrogel before drying with an aqueous solution containing from 0.1 to 0.5 weight per cent of a surface active agent based on total water content, the said surface active agent being selected from the group consisting of alkyl aryl sulfonates and sulfonated alkyl succinates.

2. The method of preparing bead form silica gel base cracking catalyst selected from the group consisting of silica alumina and silica magnesia for drying which comprises treating the bead form hydrogel with an aqueous solution of 0.1 to 0.5 weight per cent of a surface active agent based on total water content, the said surface active agent being selected from the group consisting of alkyl aryl sulfonates and sulfonated alkyl succinates.

3. A method according to claim 1 in which the surface active agent is an alkyl aryl sulfonate.

4. A method according to claim 1 in which the surface active agent is isopropyl naphthalene sodium sulfonate.

HENRY ERICKSON.

References Cited in the file of this patent

UNITED STATES PATENTS

| Number | Name | Date |
|---|---|---|
| 2,455,843 | Weir | Dec. 7, 1948 |
| 2,459,903 | Voorhees | Jan. 25, 1949 |
| 2,490,260 | Ehrhardt | Dec. 6, 1949 |
| 2,532,497 | Hoekstra | Dec. 5, 1950 |